3,018,882
SPIRAL ROLL OF PERFORATED THERMOPLASTIC MULTIPLE TUBING AND METHOD AND APPARATUS FOR PRODUCING SAME

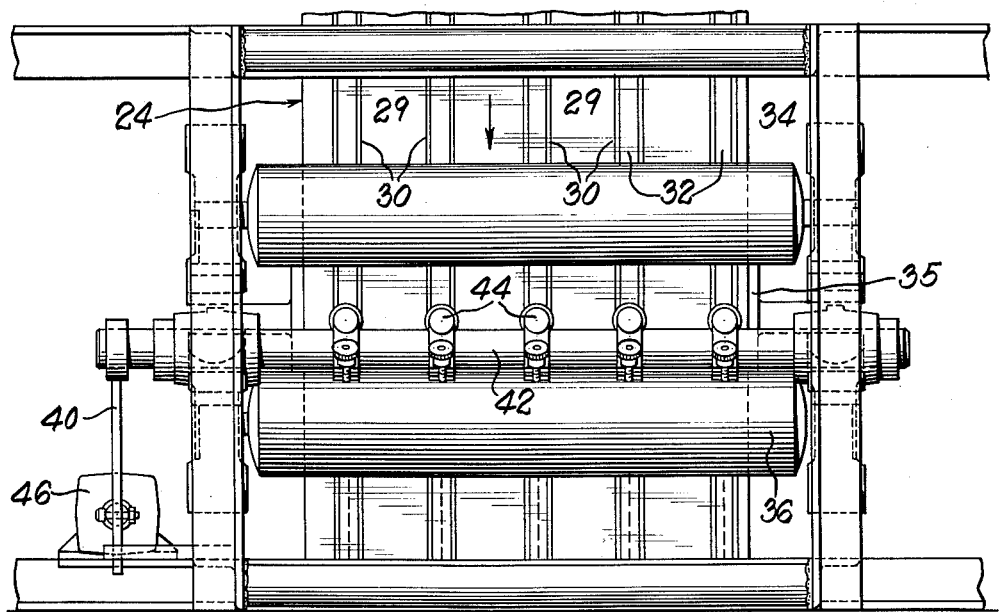
Fig. 2.
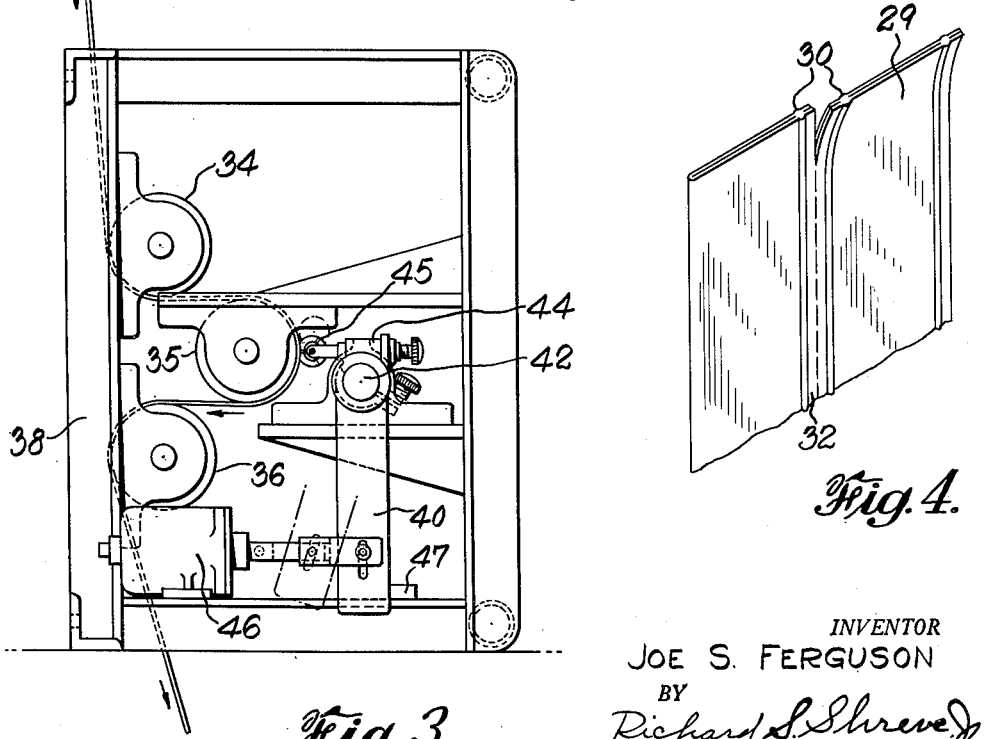
Fig. 3.
Fig. 4.
INVENTOR
JOE S. FERGUSON
BY
Richard S. Shreve
ATTORNEY

Joe S. Ferguson, Terre Haute, Ind., assignor to Union Carbide Corporation, a corporation of New York
Filed Nov. 1, 1957, Ser. No. 693,885
10 Claims. (Cl. 206—56)

This invention relates to perforated multiple tubing, and more particularly to method and apparatus for the production of such tubing from thermoplastic materials and forming therein multiple side seams with longitudinal perforations therebetween to facilitate subsequent separation of the individual tubes.

In the production of flattened, seamless, selfsustaining tubing, a thermoplastic composition was melt extruded through an annular orifice in the form of seamless tubing which was inflated to a predetermined diameter as it was being withdrawn from the die and while it was in the plastic formative state. Thereafter the inflated tubing is collapsed into a two ply ribbon.

According to the copending application of Pierce and Ferguson, Serial No. 579,034, filed April 18, 1956, the collapsed tubing is passed through a heat sealing station. This station comprises a plurality of spaced horizontally aligned heat sealing units which are disposed transversely to the path of the moving ribbon and adjustably mounted to be preset in selected positions.

Each of the heat sealing units has two runners to form one seam comprising two longitudinal laterally spaced heat seals having an unsealed tubing portion therebetween. The ribbon emerging from the heat sealing station has a plurality of longitudinally extending pockets therein between the seams.

The multiple tubing thus produced enabled the converter to print and process a plurality such as eight or more tubes simultaneously, thereby greatly increasing the efficiency of his operation, the utilization of printing equipment and reducing unit costs. Also, his first cost is lower because the film manufacturers' production costs are considerably lower for multi-tube material than for seamless tubing, permitting marketing at a correspondingly lower price.

However, the converter was required to slit the multiple tubing between the seals in order to separate the several tubes. Because the converter might process as many as eight tubes simultaneously and at very high speeds, for example, in printing or bag making operations, a considerable amount of tubing was damaged as a result of the multiple tube web weaving laterally with respect to the slitting knives. One cause of such weaving was due to the manufacturer oscillating the roll during the winding operation to prevent the seams from building up ridges in the roll delivered to the converter.

The main objects of the present invention are, therefore, to avoid this waste of the converter slitting operation, and to produce the multiple side seam tubing with longitudinal perforations between the side seams to facilitate the separation of the individual tubes subsequent to multiple converter operations.

Other objects are to provide apparatus for producing continuous longitudinal perforations between adjacent seals of multiple side seam tubing to allow easy separation of the individual tubes in the machine direction, for use in a continuous extrusion process for the production of continuous lengths of thin-walled multiple tubing which may be reeled as a single web, for the production of multiple tubing which may be printed or otherwise processed as a single web after which the individual tubes may be reeled into a spiral roll or further processed without the provision of special means for separating the individual tubes, and, to provide a method for the production of a single web of multiple tubing which, when separated into the individual tubes, results in margins of more uniform width than those obtained from previously known methods.

According to the present invention, the multiple tubing is provided with a row of elongated perforations extending longitudinally of at least one of the parallel seams and passing through said unsealed portions of the tubing walls between the two continuous heat seals of the seam.

This is accomplished, preferably after the seamless tube has been dry extruded through the annular orifice, flattened, and sealed, by continuously passing said multiple side seam tubing between an idler backing roll and a gang of spaced rotary serrated blades bearing against said backing roll and respectively engaging said multiple side seam tubing between its adjacent seals. The idler roll and a shaft parallel thereto are preferably journaled in a frame, and the gang of rotary serrated blades are preferably spaced along said shaft to engage the multiple side seam tubing between its adjacent seals. The frame preferably comprises a linkage in which the shaft is journaled, and an air cylinder operates the linkage to hold the blades against the backing roll.

In the drawings:

FIGURE 2 is a front elevation of the perforating means shown in FIGURE 1;

FIGURE 3 is a side elevation of the perforating means shown in FIGURE 2; and

FIGURE 4 is a perspective view of the longitudinally perforated multiple tubing which is the product of the process.

Figure 1:
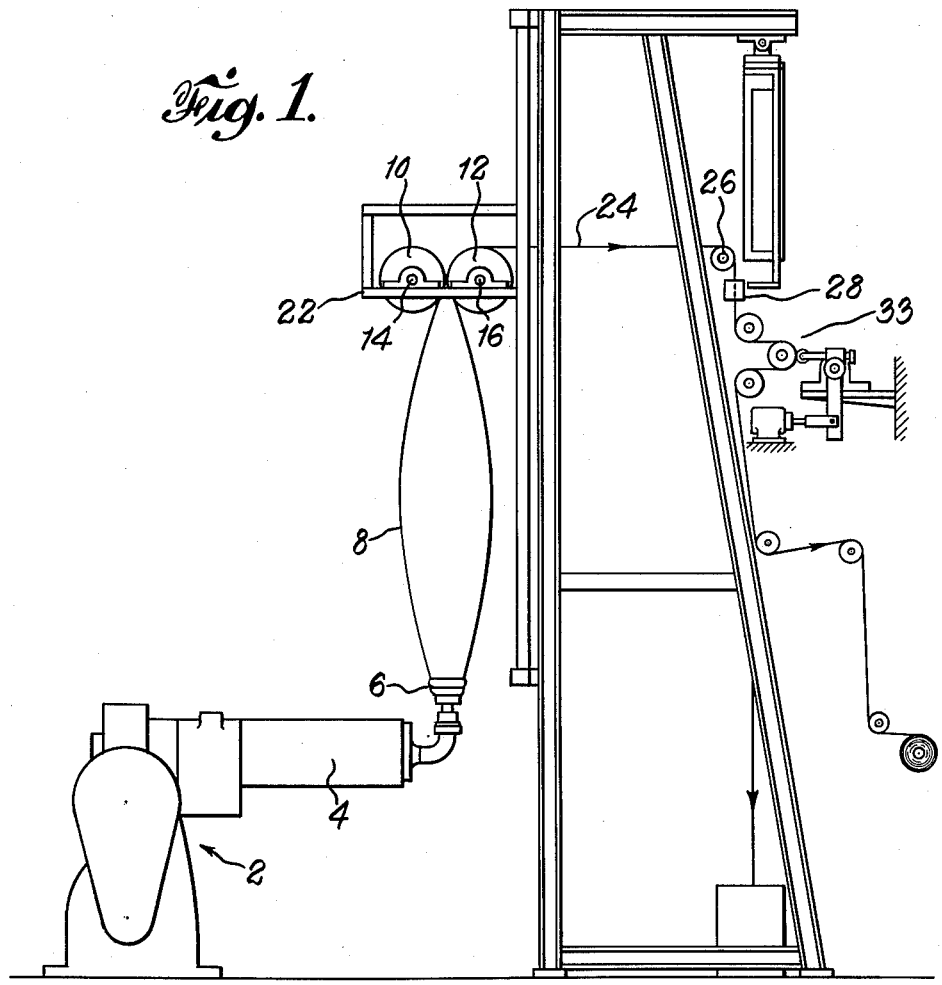
FIGURE 1 is a schematic representation of the apparatus to be employed in the process of forming longitudinally perforated multiple tubing.

In the preferred embodiment of apparatus shown, the numeral 2 designates a support for an extruder 4 which is adapted to melt a thermoplastic composition and force it through a die 6 having a annular orifice so as to form a seamless tubing 8. Means, not shown, are provided to supply an inflating medium, such as air, to the interior of the tubing 8.

A pair of squeeze rolls 10 and 12 serve to retain the inflating medium within the tubing 8 and also withdraw the tubing from the orifice in a substantially vertical direction, as the tubing is concomitantly collapsed into the form of a flattened ribbon. The squeeze rolls are mounted on shafts 14 and 16 respectively, journalled in bearings supported by a framework 22. Either or both rolls 10 and 12 are driven by conventional means, not shown, to rotate at the same peripheral speed.

A two-ply ribbon 24, which results from the collapsing action of the squeeze rolls 10 and 12 then engages a guide roll 26. The ribbon 24 then passes into and through a sealing station 28, wherein a plurality of heat seals or welded seams are formed between the two plies of the collapsed ribbon 24.

The sealing station 28 is preferably disposed as closely as is feasible to the squeeze rolls 10 and 12. As a result of such a disposition, the heat remaining in the ribbon 24 from the extrusion process is utilized in the course of the heat sealing or seam formation between the two plies of the ribbon.

Upon emerging from the heat-sealing station 28, the original two-ply film sheeting now possesses a plurality of longitudinally extending pockets 29 defined by parallel seams comprising double seals 30 spaced apart by an unsealed ribbon portion 32 as illustrated in FIGURE 2. From the heat sealing station 28 the ribbon 24 passes to a longitudinally perforating station 33, as shown in detail in FIGURES 2 and 3.

In this perforating station the ribbon 24 passes under a feed roll 34 over a hardened roll 35 and back down around a delivery roll 36. These rolls are steel idler rolls journaled in a frame 38.

The frame 38 comprises a linkage 40 in which is mounted a shaft 42 on which blade holders 44 are journaled and adjustably clamped. A series of hardened circular serrated blades 45 are respectively journaled in the blade holders 44, which are adjustable along the shaft 42 to bring the respective blades 45 between the adjacent seals 30 of the multiple side seam tubing 24.

The linkage 40 is actuated by an air cylinder 46 to rock the serrated blades 45 about the shaft 42 into engagement with the tubing 24 and bear against the back up roll 35. An adjustable stop 47 is provided to limit the travel of the blades as they are rotated into position by means of the air cylinder and linkage.

In operation, the web of multiple tubing 24 is wrapped 180° around the hardened roll 35 and provides a friction drive for this idle roll. One serrated blade 45 is evenly spaced between each pair of adjacent seals 30 and the blade holder 44 is clamped in position on the shaft 22. Following adjustment of the blade holders 44, the mounting shaft 42 is rotated into position and the circular blades 45 are brought to bear against the hardened roll 35. The blades rotate continuously as the result of riding on this roll and produce a continuous perforation between the seals 30 as the web 24 passes between the roll 35 and the blades 45.

The preferred tubing is made of polyethylene and can have a wall thickness of from about .0005 to .005 inch or more. In general the invention can be utilized with any melt extrudable thermoplastic material, mixtures thereof, and mixtures of synthetic rubbers with thermoplastic materials. Each thermoplastic substance possesses certain properties which make it necessary to determine by experiment the variables in the process which have to be balanced in order to produce tubing of the desired characteristics. Hereafter is set forth a list of illustrative thermoplastic materials which can be used in this invention in addition to polyethylene.

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as plasticizers, fillers, coloring agents, heat stabilizers, anti-oxidants, etc.

Since it is obvious that various changes and modifications may be made in the above description without departing from the nature or spirit thereof, this invention is not restricted thereto except as set forth in the appended claims.

I claim:

1. An article of manufacture comprising a spiral roll of a longitudinally continuous length of integral flattened tubing of thermoplastic material having an integral peripheral wall with longitudinal folds at each side thereof extending throughout said continuous length of tubing in the roll and a plurality of parallel pockets transversely spaced between said side folds and extending longitudinally throughout said continuous length of tubing in the roll, each pocket being separated from an adjacent pocket by a parallel seam between opposed wall portions and extending throughout said continuous length of tubing in the roll, each of said parallel seams comprising two parallel spaced continuous heat seals between said opposed wall portions separated by unsealed portions of said tubing walls and extending longitudinally throughout said continuous length of tubing in the roll, and a row of perforations extending longitudinally of at least one of said parallel seams throughout said continuous length of tubing in the roll and passing through said unsealed portions of the tubing walls between the two continuous heat seals of said seam.

2. An article of manufacture comprising a collapsed integral package comprising surface to surface contacting layers of a longitudinally continuous length of tubing of polyethylene defining a flat two-ply ribbon, said tubing having a plurality of parallel seams extending longitudinally of said ribbon throughout said continuous length, each of said seams comprising two parallel continuous heat seals between said opposed plies maintained in spaced relationship by unsealed portions of said opposed plies, and a row of perforations extending longitudinally throughout said continuous length of at least one of said seams and passing through said unsealed portions of said opposed plies between said two parallel continuous heat seals of said seam.

3. An article of manufacture comprising a spiral roll of a longitudinally continuous length of integral flattened tubing of thermoplastic material having an integral peripheral wall with spiral folds at each side thereof and a plurality of spiral pockets, each pocket being separated from an adjacent pocket by a spiral seam between opposed wall portions, each of said spiral seams comprising two parallel spaced spiral heat seals between said opposed wall portions separated by unsealed portions of said tubing walls, and a spiral row of perforations extending longitudinally of at least one of said parallel spiral seams and passing through said unsealed portions of the tubing walls between the two continuous spiral heat seals of said seam.

4. In a method for producing multiple side seam tubing with perforations between the side seams to define individual tubes, which comprises continuously extruding a thermoplastic melt into the form of seamless tubing, passing said tubing between flattening squeeze rolls to form two coextensive plies therefrom, continuously passing said plies longitudinally through a sealing station at extrusion speed and thereby sealing said coextensive plies together to form a plurality of parallel longitudinal seams having opposed unsealed ply portions defining the midportions of each of said longitudinal seams between said coextensive plies, which seams define a plurality of parallel pockets in said plies, continuously passing said multiple longitudinally seamed tubing from said sealing station to and between an idler backing roll and a gang of spaced rotary disk circumferentially serrated blades bearing against said backing roll and respectively engaging said multiple side seam tubing between its adjacent longitudinal seals to continuously perforate said tubing longitudinally thereof and thereby facilitate subsequent separation of the tubing into individual tubes, and passing said longitudinally perforated multiple side seam tubing over a wind up roll to form said tubing, seams, seals and perforations into spirals inside a roll.

5. In a method for producing tubing from thermoplastic materials, the steps comprising continuously extruding a molten thermoplastic composition into the form of a seamless tubing, continuously flattening said tubing at a point spaced from the point of extrusion to form two coextensive plies therefrom, continuously sealing said coextensive plies longitudinally thereof to form a plurality of seams having an unsealed portion defining the midpoint of each seam, and continuously perforating said plies longitudinally thereof at extrusion speed at substantially the midpoint of each of said seam unsealed portions to permit said sealed plies to be separated into a plurality of discrete thermoplastic tubings.

6. In a method for producing tubing from thermoplastic materials, the steps comprising continuously extruding a molten thermoplastic into the form of a seamless tubing, continuously flattening said tubing at a point spaced from the point of extrusion to form two coextensive plies therefrom, continuously sealing together said coextensive plies longitudinally thereof at extrusion speed to form a plurality of parallel seams having opposed unsealed ply portions defining the midportions of each of said seams between said coextensive plies, which seams define a plurality of parallel pockets in said plies, continuously perforating said plies longitudinally thereof at extrusion speed at the midportions of said seams to permit said pockets to be separated into a plurality of discrete thermoplastic tubings, and continuously winding up said perforated tubing into roll form.

7. Method of producing from a single tube multiple side seam tubing with longitudinally extending perforations between the side seams to define individual tubes, which comprises axially spacing a gang of rotary disk circumferentially serrated blades to register between said side seams, continuously passing said multiple side seam tubing longitudinally between an idler backing roll and said gang of spaced rotary disk circumferentially serrated blades bearing against said backing roll and respectively engaging said multiple side seam tubing between its adjacent seals, to continuously perforate said tubing longitudinally thereof and thereby facilitate subsequent separation of the tubing into individual tubes.

8. In a combination for continuously forming multiple side seam tubing with perforations between the side seams to define individual tubes, the combination comprising extrusion means for dry extruding a thermoplastic melt into an inflated seamless tubing, means for withdrawing said inflated tubing from said extrusion means and concomitantly collapsing the same into a flattened two-ply ribbon, a plurality of heat sealing means, means for passing said flattened ribbon from said withdrawing means into longitudinally sliding engagement with said heat sealing means whereby the plies thereof are fused together, forming a longitudinally extending seam comprising longitudinal parallel spaced seams between said ribbon plies having an unfused portion disposed between said seals, continuously operating longitudinally perforating serrated means disposed in alignment with said heat sealing means, means for passing said multiple longitudinally sealed tubing from said sealing means longitudinally through said perforating means for perforating substantially the midpoint of said longitudinally extending central unfused portion of each of said longitudinal seams, and means for winding said longitudinally seamed, sealed, and perforated multiple tubing into a spiral roll.

9. A combination for producing tubing comprising die means, means for extruding a molten thermoplastic through said die means to form an inflated seamless tubing, withdrawing means spaced from said die means for removing said tubing from the point of extrusion, said withdrawing means also collapsing said inflated seamless tubing upon engaging the same whereby two coextensive moving plies of the collapsed tubing are formed, heat-sealing means for sealing said co-extensive plies together along predetermined axes disposed parallel to the longitudinal axis of said plies whereby a plurality of longitudinally extending pockets are formed therein, and transversely adjustable continuously operating longitudinally perforating means for engaging said plies between said pockets and spaced from said heat sealing means in the path of said moving plies.

10. In a combination for continuously forming multiple thermoplastic tubing, the combination comprising extrusion means for dry extruding a thermoplastic melt into an inflated seamless tubing, withdrawing means for withdrawing said inflated tubing from said extrusion means and concomitantly collapsing the same into a flattened two-ply ribbon, a plurality of heat-sealing means, said flattened ribbon longitudinally slidably engaging said heat sealing means whereby the plies thereof are fused together, forming a longitudinally extending seam comprising parallel-spaced seals between said ribbon plies having a central unfused portion disposed between said seals, and continuously operating longitudinally perforating serrated means disposed in alignment with said heat-sealing means for perforating substantially the midpoint of said central unfused portion of each of said seams.

References Cited in the file of this patent

UNITED STATES PATENTS

| | | |
|---|---|---|
| 922,772 | Kaufman | May 25, 1909 |
| 2,112,419 | Krause et al. | Mar. 29, 1938 |
| 2,237,346 | Gilfillan | Apr. 8, 1941 |
| 2,347,439 | Shea et al. | Apr. 25, 1944 |
| 2,382,175 | Salfisberg | Aug. 14, 1945 |
| 2,444,685 | Waters | July 6, 1948 |
| 2,452,080 | Stephenson | Oct. 26, 1948 |
| 2,461,975 | Fuller | Feb. 15, 1949 |
| 2,547,779 | Renyck | Apr. 3, 1951 |
| 2,800,163 | Rusch | July 23, 1957 |
| 2,805,700 | Klasing et al. | Sept. 10, 1957 |
| 2,830,396 | Gowland | Apr. 15, 1958 |
| 2,877,893 | Volckening et al. | Mar. 17, 1959 |
| 2,884,988 | D'Angelo | May 5, 1959 |
| 2,885,071 | Rodnon | May 5, 1959 |